United States Patent [19]

Stanley et al.

[11] Patent Number: 5,322,585

[45] Date of Patent: Jun. 21, 1994

[54] METHOD AND APPARATUS FOR MAKING TAPE CARTRIDGES

[75] Inventors: Donald Stanley; Kenneth Sheppard; Leif Skaar, all of San Diego, Calif.

[73] Assignee: Verbatim Corporation, Charlotte, N.C.

[21] Appl. No.: 39,879

[22] Filed: Mar. 30, 1993

Related U.S. Application Data

[62] Division of Ser. No. 892,762, Jun. 3, 1992.

[51] Int. Cl.$^5$ .................. B23P 19/04; B23P 21/00; G11B 23/00
[52] U.S. Cl. .................................. 156/293; 29/806; 360/132; 360/134; 242/199
[58] Field of Search ............... 29/806; 360/132, 134; 242/199; 156/293

[56] References Cited

U.S. PATENT DOCUMENTS

| | | | |
|---|---|---|---|
| 4,127,925 | 12/1978 | Gaiser et al. | 29/806 X |
| 4,707,757 | 11/1987 | Shiba et al. | 242/199 X |
| 5,034,839 | 7/1991 | Okamura et al. | 242/199 X |

OTHER PUBLICATIONS

Sony Corporation "Proposal to Quarter-Inch Cartridge Drive Standards, Inc," Nov. 20, 1991.

Primary Examiner—Jeff H. Aftergut
Attorney, Agent, or Firm—Albert C. Smith

[57] ABSTRACT

A data tape cartridge is formed on a baseplate of polymeric material which supports mounting pins and tape guides thereon for supporting tape components in rigid and dimensionally-stable manner using integrally formed bosses to support the mounting pins and guides. Additional stability against flexure is achieved using a matrix pattern of integrally-formed webs or ribs and sidewalls in the baseplate and by attaching a top plate substantially about the entire perimeter of the sidewalls. Lateral forces exerted against rotatable components on the mounting pins are transferred to the baseplate and top plate by the mounting pins that are supported in both plates. A midguide support is integrally formed in the baseplate to support a guide pin at critical location adjacent the location along the tape path in the cartridge at which a tape transducer interacts with tape. Methods of assembly include inserting mounting pins and tape guides into the baseplate while the material of the baseplate about the mounting pins is plasticized, and also include assembling the components of the cartridge in upside-down orientation for transfer to aligned pins and guides in the baseplate.

5 Claims, 10 Drawing Sheets

METHOD AND APPARATUS FOR MAKING TAPE CARTRIDGES

This is a divisional of copending application Ser. No. 07/892,762 filed on Jun. 3, 1992.

Field of the Invention

This invention relates to magnetic tape cartridges, and more particularly to the structure and method of making low-cost, precision tape cartridges.

BACKGROUND OF THE INVENTION

Reel-to-reel magnetic tapes and one-half inch and one-quarter inch magnetic tape data cartridges are commonly used for the storage of electronic data signals. A typical tape data cartridge comprises a metal base plate with pins extending upwardly from the plate to support corner rollers, reel hubs, a drive roller, and posts which extend upwardly to support tape guides. Typically, the walls and top of the cartridge are made of polymeric material and the top usually includes a spring to limit the vertical movement of the reel hubs. The tape alignment must be precise for the recording or the retrieving of the desired data signals on the tape. Therefore, it is very important that the pins and posts maintain their alignment during cartridge use.

With the metal base plate currently used, the pins are rigidly secured to the metal base plate and the metal base plate provides sufficient rigidity to support the various components received on the pins such that the tape does not become misaligned or dislodged during use. However, the metal base plate is a major contributing expense to the overall cost of the cartridge. The use of a polymeric material for the base plate typically does not achieve the equivalent structural strength required for successful use of the cartridge. If such polymeric material is too hard, inserting the pins into the material presents an additional problem of stress and fatigue cracks commonly occuring where the pins are inserted. Conversely, too soft a polymeric material imparts an elasticity to the pins received in the material which results in misalignment of the tape and associated components in use.

SUMMARY OF THE INVENTION

In accordance with the present invention a cartridge is formed of polymeric material to include a base plate which imparts to the pins received therein a functional rigidity at least equivalent to that of a metal base plate. The polymeric base plate includes integral side walls of the same material that is compatible with the material of the top plate of the cartridge for ultrasonic welding or gluing together and for closely matching thermal coefficients of expansion. The polymeric base plate also includes an integrally-formed midguide member to ensure precise alignment of the tape as it passes a read/write head, and also includes a plurality of ribs or webs in a matrix pattern to enhance planar stiffness and torsional rigidity of the assembled cartridge. In the method of assembly according to the present invention, pins for rotatably supporting tape hubs and belt rollers are inserted into the polymeric base plate without attendant stress cracks or fissures, with the upper ends of the pins disposed to be supported in a top plate. The entire structure is rigidly assembled to provide accurate alignment of critical tape components. A write-protect device is attached to the assembled tape cartridge for snap-off write protection of data signals on the tape within the assembled cartridge. A tape-loading process facilitates assembling pre-loaded hubs of tape onto the base plate with tape and drive belt and associated components in proper registration on pins and tape guides on the base plate.

Specifically, the present invention embodies a polymeric cartridge having a base plate formed of fiberglass-filled polycarbonate material with metal pins received in bosses that are integrally formed on an inner surface of the base plate. Side walls are integrally formed on the base plate of the same material as the base plate to enhance rigidity of the base plate against flexure and torsional distortions. The base plate imparts to the pins a stability which is similar to the stability of pins secured in prior-art metal base plates. The base plate additionally includes a rib-like midguide support and a midguide pin secured therein to insure proper alignment of the tape as it passes a read/write head. The top plate of the cartridge is formed preferably of polycarbonate material with apertures therein positioned to receive and rigidly support the upper ends of the pins. The top plate is rigidly secured to the side walls of the base plate by ultrasonic welding or adhesive, and may carry elastomeric springs which are secured to the underside of the cover to limit the axial play of the tape hubs.

In the method of manufacturing the cartridge according to the present invention, a plurality of pins are secured in a fixture and a base plate having apertured bosses is spaced from the pins in alignment with the apertures in the bosses. The base plate is then relatively moved into contact with the pins and the material of the base plate is effectively plasticized at the locations of contact with the pins from an initial set state to a second or plastic state by application of ultrasonic energy or heat, or both, to the pins or base plate. The pins are simultaneously forced into internal apertures in the bosses, carrying at least some of the plasticized material of the aperture wall ahead of the leading ends of the pins. After the pins have been inserted a predetermined distance the ultrasonic energy or heat is removed and the material of the base plate returns to its initial set state, rigidly securing the pins in the bosses. The material which was displaced ahead of the leading end of the pins sets within the aperture to form a floor for the pins and the walls of the aperture, thereby sealing the apertures and further rigidly supporting the pins in the base plate. After hubs containing a coiled length of tape, and the tape guides, and the drive belt and associated rollers are all assembled on the base plate, a top plate, having apertures therein that are aligned to receive and rigidly support the upper ends of the pins, is urged into position on the pins and is secured fastened to the sidewalls of the base plate.

DESCRIPTION OF THE PREFERRED EMBODIMENT

Figure 1A:
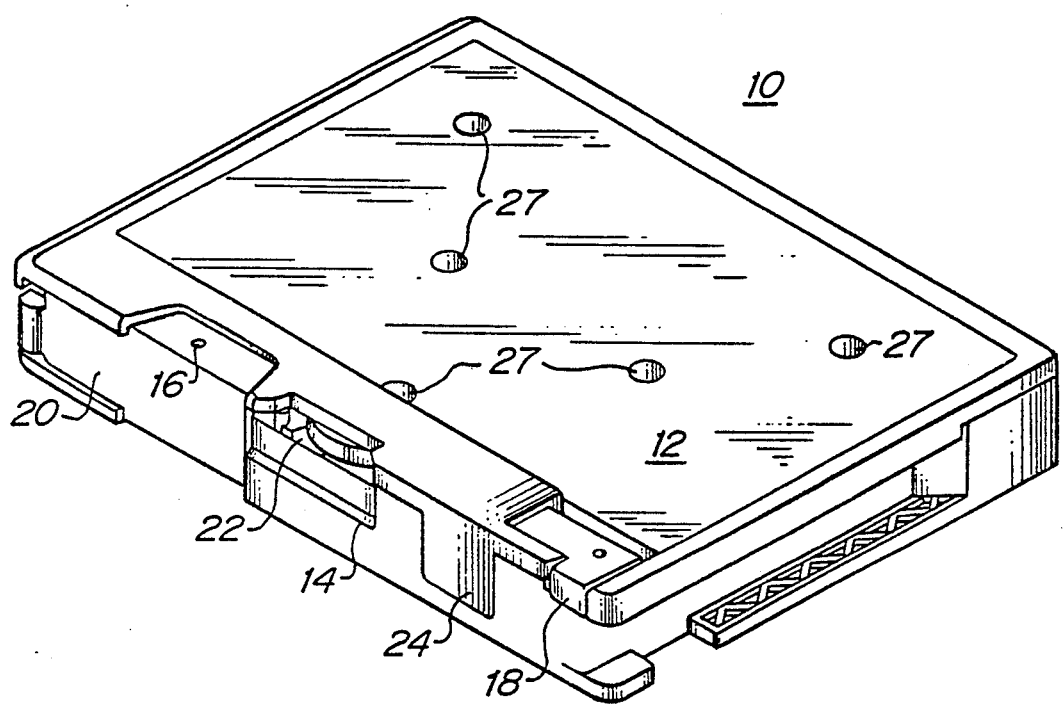
FIG. 1(a) is a perspective view of an assembled tape data cartridge.

Referring now to FIG. 1(a), there is shown a perspective view of a tape data cartridge 10 that includes a top cover 12, a front wall 14 including a recess 16 (in which a read/write head, not shown, is received), a write protect device 18, a conventional pivoted door 20 over the recess 16, a drive roller 22, and an optical window 24 for passing optical signals that identify the end of tape and bottom of tape. Tape data cartridges of this type are standardized in dimensions and orientation of components according to proposed American National Standards Institute (ANSI) Standard No. X3B5/90-218a. Tape data cartridges of this type are operated via a single drive roller 22 that is coupled to an internal drive belt which traverses the perimeter of each reel of tape and passes over a pair of guide rollers positioned near the remote rear corners of the cartridge, as described, for example, in the aforementioned ANSI Standard. In addition, the door 20 is pivoted near the forward left-side corner to swing open in outward direction from the recess 16 to expose the recording tape to a read/write tape transducer that may be positioned in the recess to contact tape in the cartridge. Additionally, the optical window 24 passes optical signals therethrough which passed through apertures in the tape, as described for example in the aforementioned ANSI Standard. Finally, a removable write-protect device 18 is snap-fitted into a recess in the top plate 12 of the cartridge to engage a transducer suitably positioned in a receiving tape drive mechanism to inhibit recording or writing onto the tape contained within the cartridge 10 when the device 18 is not present on the cartridge.

Figure 1B:
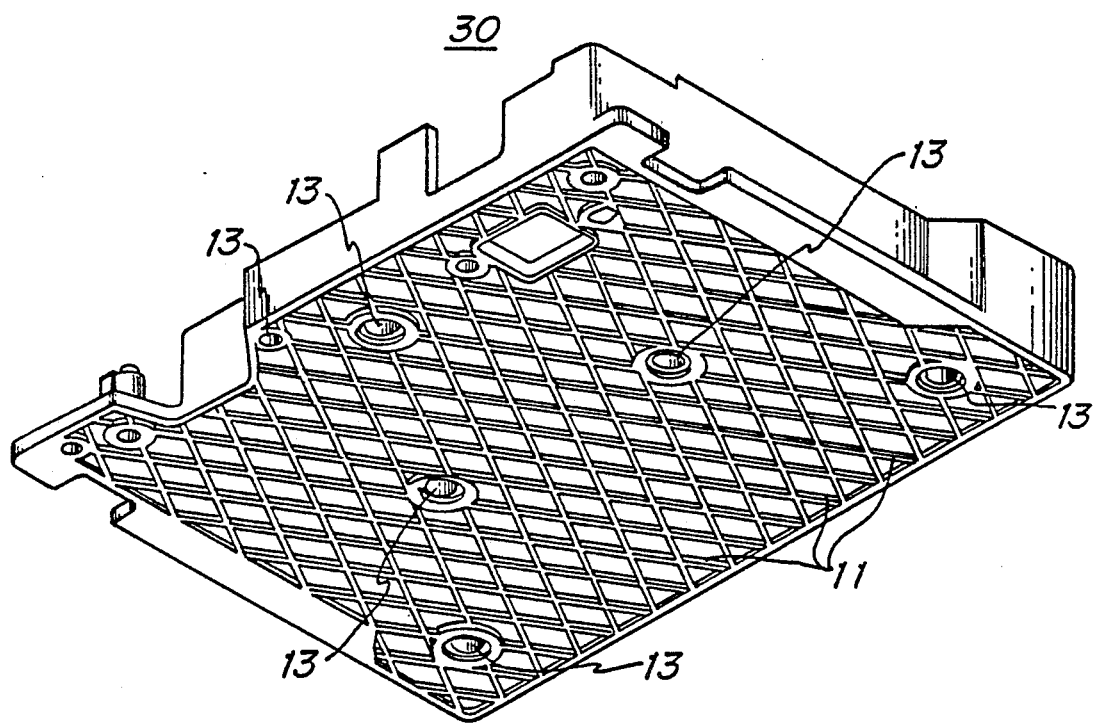
FIG. 1(b) is a perspective bottom view of a base plate for a tape data cartridge embodying the invention.

Referring now to FIG. 1(b), there is shown a perspective bottom view of the base plate 30 showing the integral front and sidewalls and showing the matrix pattern of ribs or webs 11 traversing the plane of the bottom of the base plate 30, and also showing the apertured 13 undersides of the bosses that support pins and guides. The base plate 30 with integral walls and associated pin bosses and ribs or webs 11 may all be formed in a common mold in conventional manner using a composition such as polycarbonate plastic filled with about 20% by volume of glass fibers, and optionally including conductive material such as carbon or other metallic particles to provide electrostatic and electromagnetic shielding as well as enhanced thermal conductivity. Alternately, the base plate 30 may be plated with metal or coated with conductive paint or ink to provide electrostatic shielding.

Figure 2:
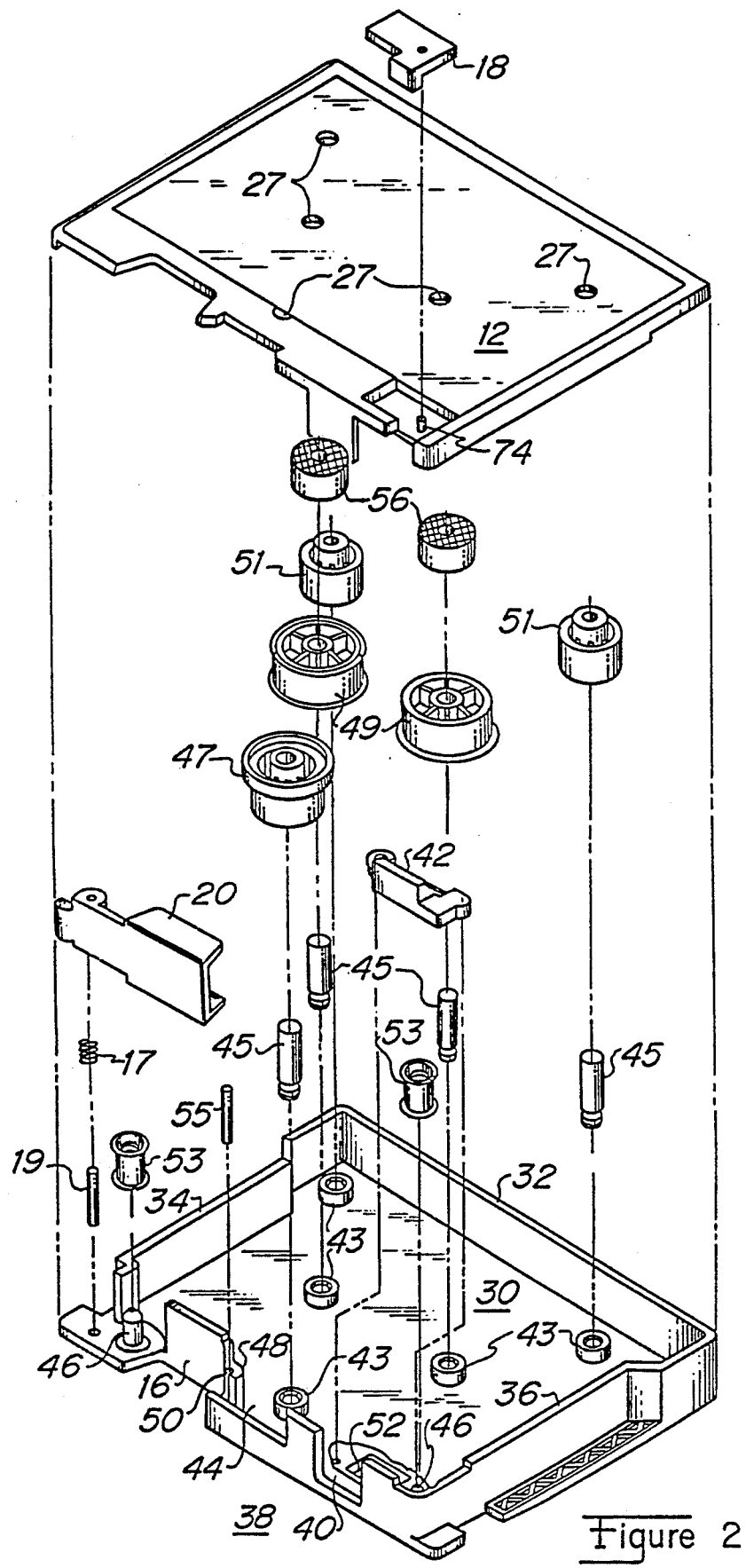
FIG. 2 is an exploded perspective view of the tape data cartridge of FIG. 1(a)

Referring now to FIG. 2, there is shown a perspective exploded view of a tape data cartridge showing the internal components of the cartridge (less tape and drive belt) according to the present invention. Specifically, the base plate 30 includes integrally-formed rear and side walls 32, 34, 36 and a front wall 38 having a plurality of openings therein, as later described herein. At least five raised, pin-receiving bosses 43 are also integrally-formed in the base plate 30 to receive and rigidly support pins 45 that serve as axles for the drive roller 47, the tape hubs 49, and the drive-belt rollers 51. In addition, the base plate 30 includes integrally-formed support pegs 46 for tape-guide sleeves 53 and a midguide support rib 50 for retaining tape-guiding pin 55 in proper orientation adjacent the recess 16. The door 20 is pivoted about pin 19 and is spring biased 17 to normally closed position over the recess 16. An optical prism 42 formed, for example, of clear polycarbonate or acrylic plastic material includes a reflecting surface such as a mirror oriented at a 45° angle to the bottom of the base plate 30. This prism 42 is mounted over the window 52 in the base plate 30 and in alignment with aperture 40 in the front wall 38 for passing optical signals through a tape that is oriented to pass along a path between tape guide 53 inside the front wall 38 and past the aperture 40, as later described herein. Elastomeric elements including a foam layer and an underside slippery layer such as ultrahigh molecular weight polyethylene or polypropylene 56 may be adhered to the top plate 12 in registration over the axes of the tape hubs 49 to limit the end-play movement of the tape hubs 49 on their respective support pins 45. The top plate 12 may be formed of polycarbonate material closely matching the thermal coefficient of expansion of the base plate material, and may be ultrasonically welded or adhesively attached about its perimeter to the top edges of the walls 32, 34, 36 and 38 to form a rigid structure housing the components in precise orientation. The apertures 27 in the top plate are aligned to receive and rigidly support therein the upper ends of the pins 45.

Figure 3:
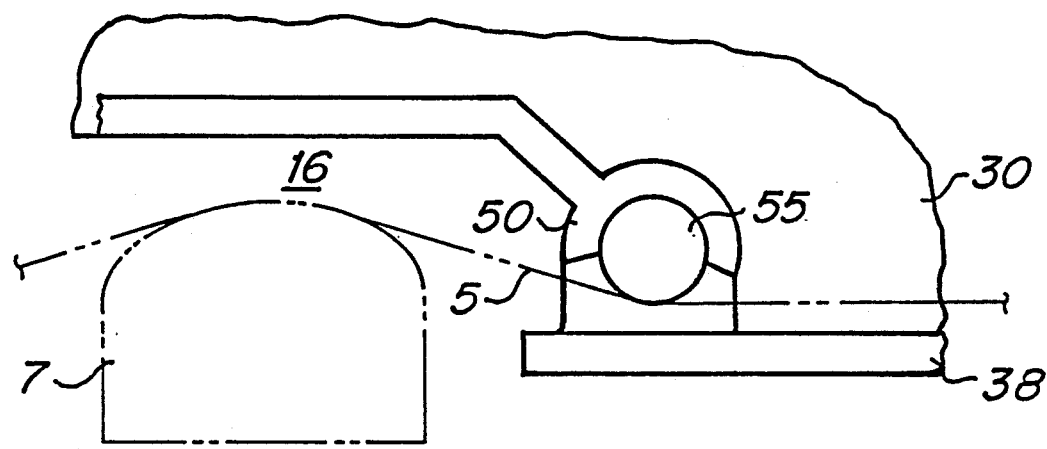
FIG. 3 is a top view of the midguide portion of the base plate according to FIG. 2.

Referring now to FIG. 3, there is shown a cutaway view of the midguide portion of the base plate 30 showing the integral midguide support rib 50 retaining a tape-guide pin 55 in proper vertical orientation relative to the base plate 30 for correctly guiding a tape 5 over a read/write tape transducer 7 that may be positioned within the recess 16 in the front wall 38. This support rib 50 is disposed around greater than half the circumference of pin 55 to assure retention of the pin 55 over its length in rigid vertical orientation relative to the base plate 30.

Figure 5:
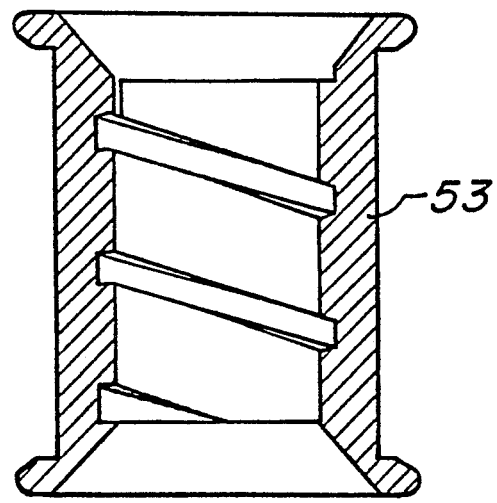
FIG. 5 is a front sectional view of an alternative embodiment of a tape guide.
Figure 4:
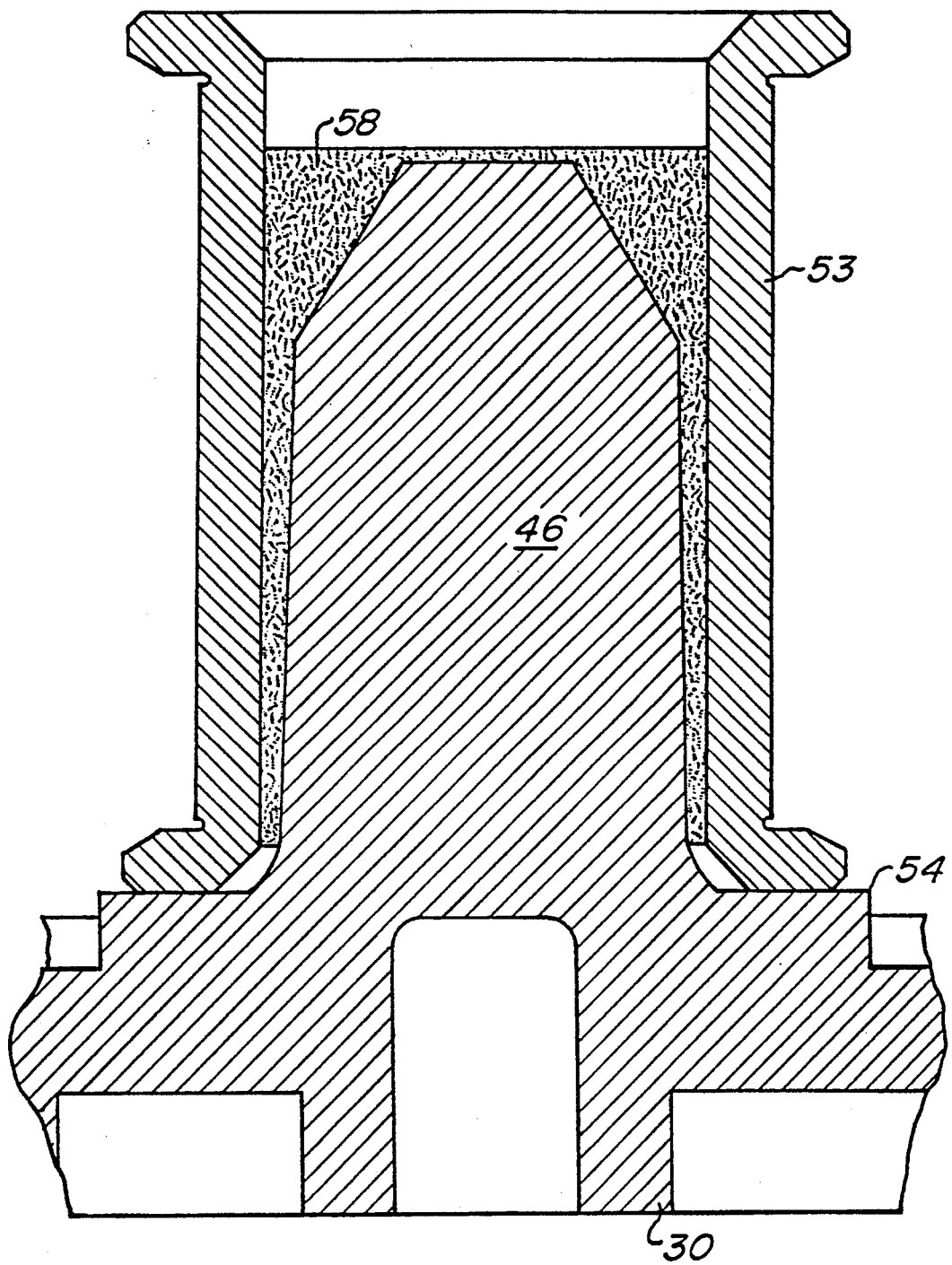
FIG. 4 is a front sectional view of a tape guide assembled on a base plate according to FIG. 2.

Referring now to FIG. 4, there is shown a sectional view of a tape guide 53 mounted on an integral support peg 46 in rigid orientation relative to the base plate 30. Specifically, the raised boss 54 and the support peg 46 are integrally formed on the base plate 30 to orient the sleeve-like tape guide 53 at the proper vertical elevation and perpendicular orientation relative to the base plate 30. An adhesive 58, for example, that is curable under ultraviolet radiation (such as LOCTITE 399, commercially available from LOCTITE CORP.) retains the tape guide 53 in fixed position without rotational or translational movement on support peg 46 and raised boss 54. Alternatively, as illustrated in the sectional view FIG. 5, the tape guide 53 may include internal grooves such as in the shape of a helix to facilitate attachment and ample adhesion of the sleeve-like guide 53 to the support peg 46. These tape guides may be formed of stainless steel, nickel-silver, or similar material and smoothly polished to provide controlled frictional engagement with tape.

Figure 6:
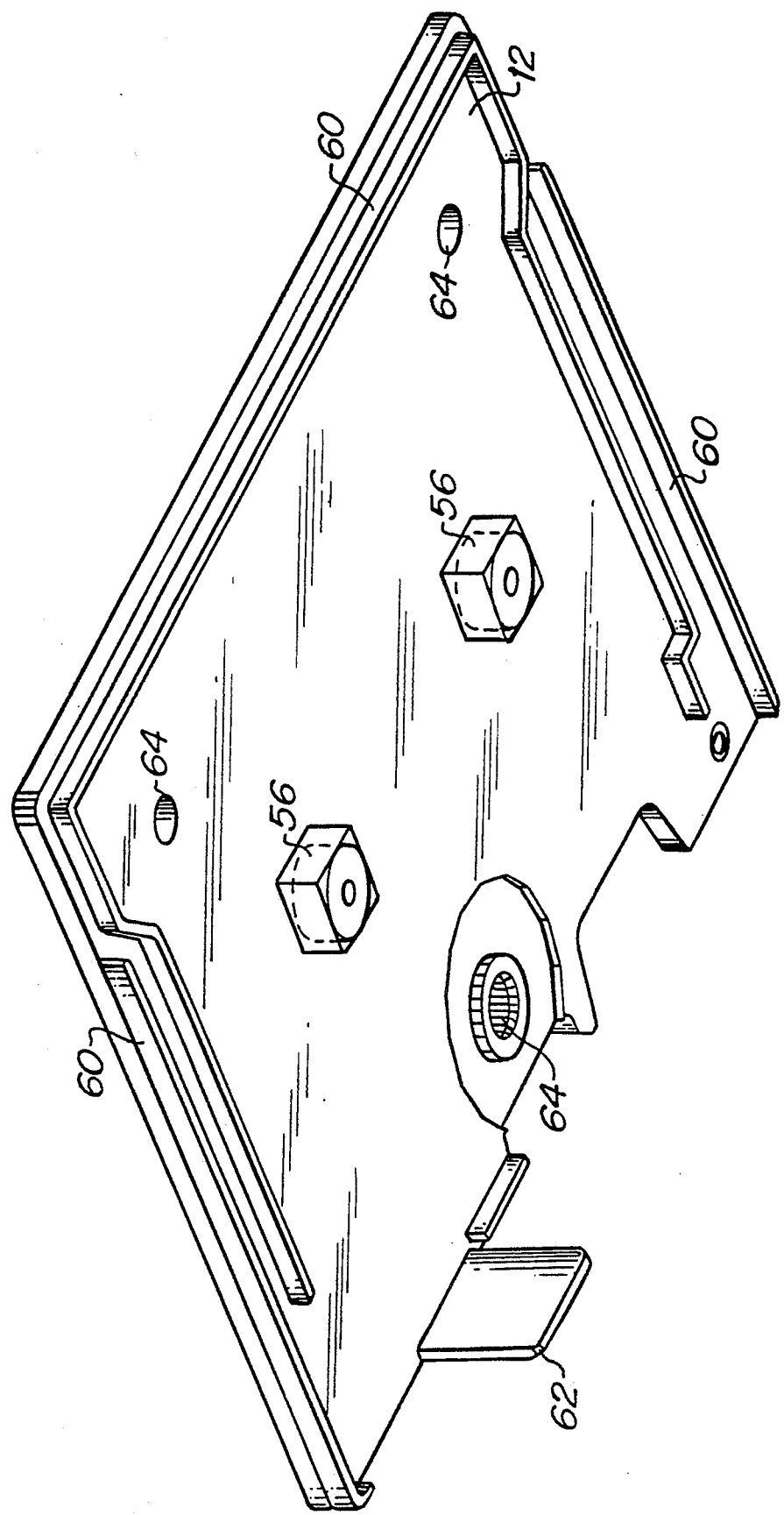
FIG. 6 is a bottom view of a top plate for a tape data cartridge embodying the invention.

Referring now to FIG. 6, there is shown a bottom perspective view of the top cover which may be formed of plastic material such as polycarbonate to promote compatibility with the base plate material relative to thermal expansion coefficients and to facilitate ultrasonic or adhesive attachment thereof to the top edges of the walls of the base plate 30. The edge-oriented protrusions 60 provide edge rigidity and promote concentration of ultrasonic energy during conventional ultrasonic bonding of the top plate 12 to the walls of the base plate 30. Alternatively, such protrusions serve as dams to retain adhesive in place and provide greater adhering surface attachment of the top plate 12 to the walls of the base plate 30. The integral descending tab 62 serves as a transparent window that is positioned in the aperture 40 in the front wall 38 when the cartridge is assembled. One or more pin-receiving bosses 64 are disposed to frictionally receive therein the top ends of the pins 45 that support the drive roller 47, tape hubs 49, and belt rollers 51. In this manner, lateral forces applied, for example, to the perimeter of drive roller 47 can be transferred via the supporting pins 45 to the top plate 12 and to the base plate 30 which thus retain such pins at both ends thereof in vertical orientation relative to the base plate 30. The elastomeric elements 56 may be adhered to the top plate 12 in proper registration over the tape hubs 49 and about the upper end of the associated pins 45 to provide light resilient force against the tape hubs when the cartridge is assembled.

Figure 7:
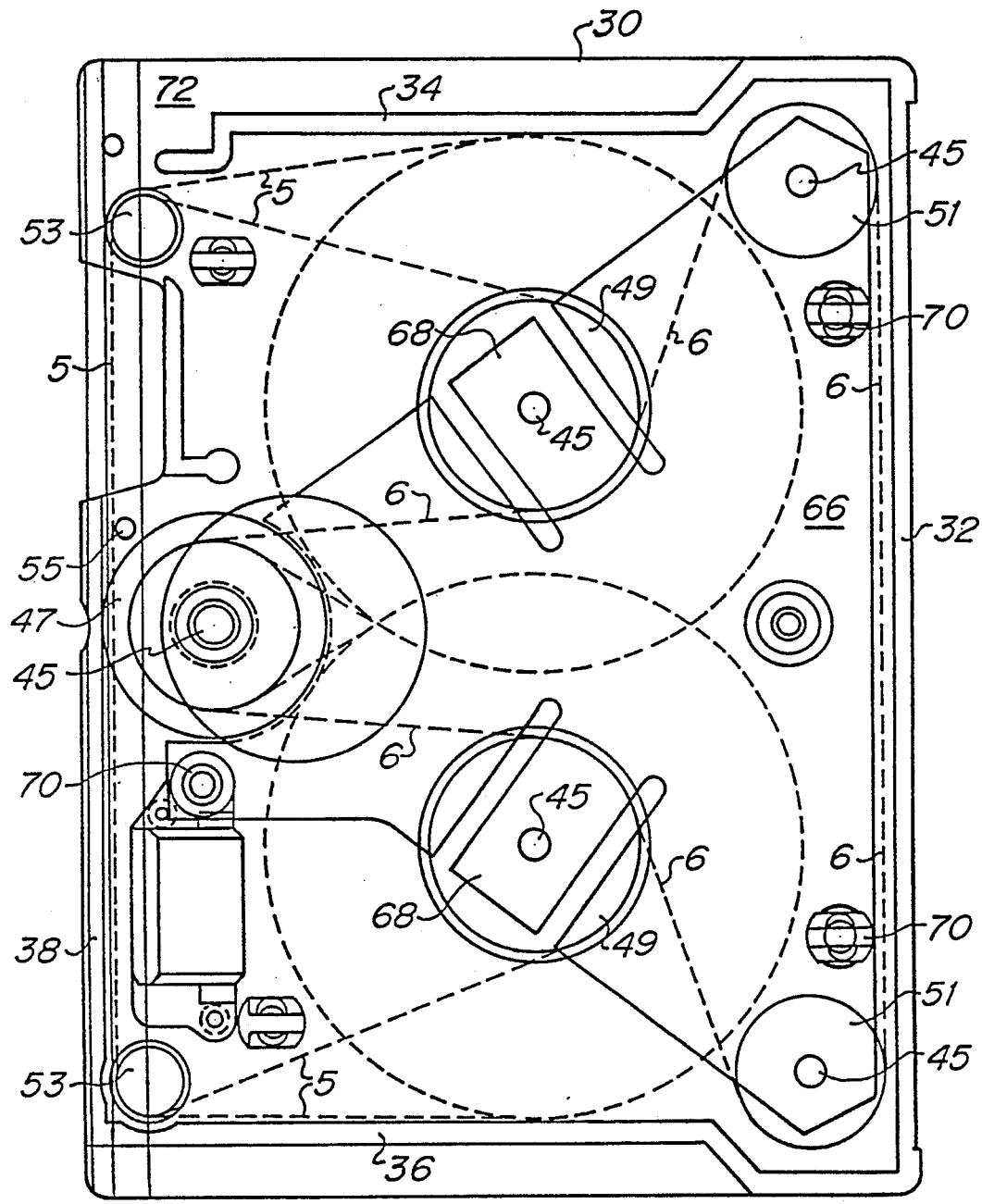
FIG. 7 is a top view of an alternative embodiment of a tape date cartridge showing a top plate according to an of the present invention.

Referring now to FIG. 7, there is shown a top view of an alternative embodiment of a tape data cartridge including a top support plate 66 according to the present invention in which the upper ends of all support pins 45 for rollers and hubs for the drive belt and tape are received in and supported by the top support plate 66. In addition, resilient bias in the axial direction against the tape hubs may be provided by leaf springs 68 integrally formed in the top support plate 66 which is rigidly mounted at spaced elevation above the base plate 30 via fasteners 70. In this embodiment of the invention, lateral forces exerted on the support pins 45 are transferred via both ends of such pins to the top support plate 66 as well as to the base plate 30 via fasteners 70 rather than via sidewalls 32, 34, 36, and 38. A top cover 72 overlays the top support plate 66 for attachment to side walls of the base plate 30. In either embodiment, the top plate 12 or top cover 72 includes a write-protect device 18 as illustrated in FIGS. 1(a) and 2 which may be retained in place by one or more integral peg(s) 74 that frictionally engage the device 18 to retain it in place. When selected by a user of the tape data cartridge, the device may be pried off the peg(s) 74 to provide write protection in conventional manner for data on the tape 5 within the cartridge 10.

Figure 8A:
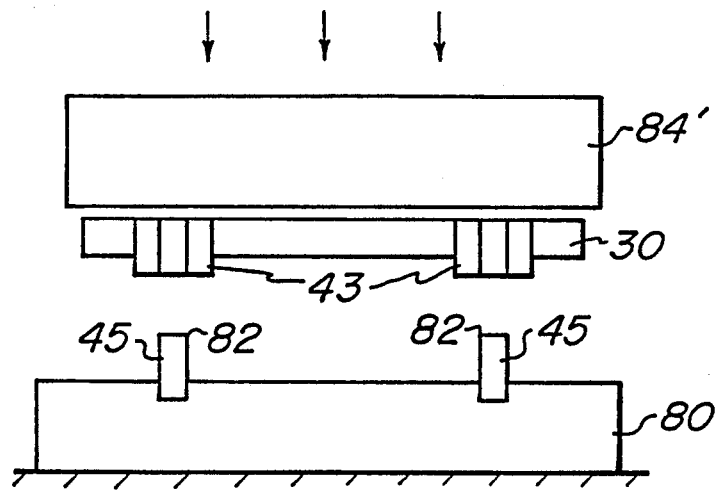
FIGS. 8(a), 8(b) and 8(c) are schematic illustrations of the steps of pin insertion into a base plate according to the present invention.
Figure 8B:
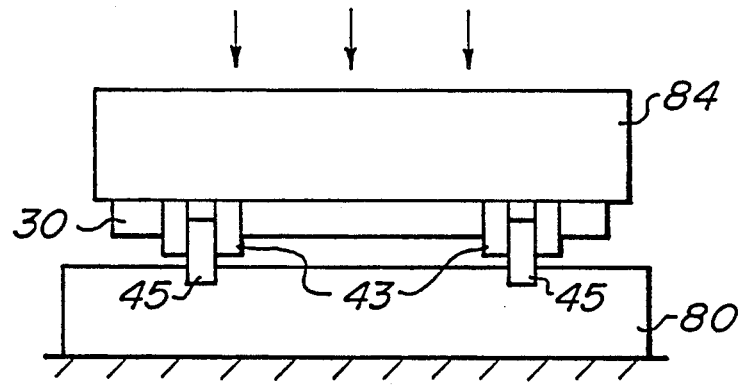
Figure 8C:
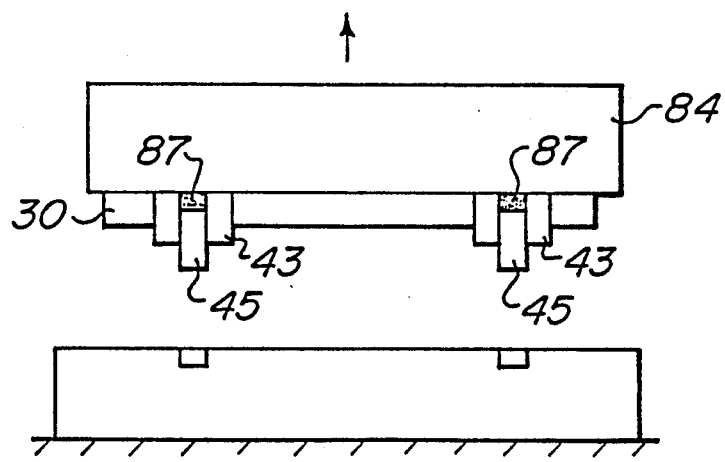
Figure 9A:
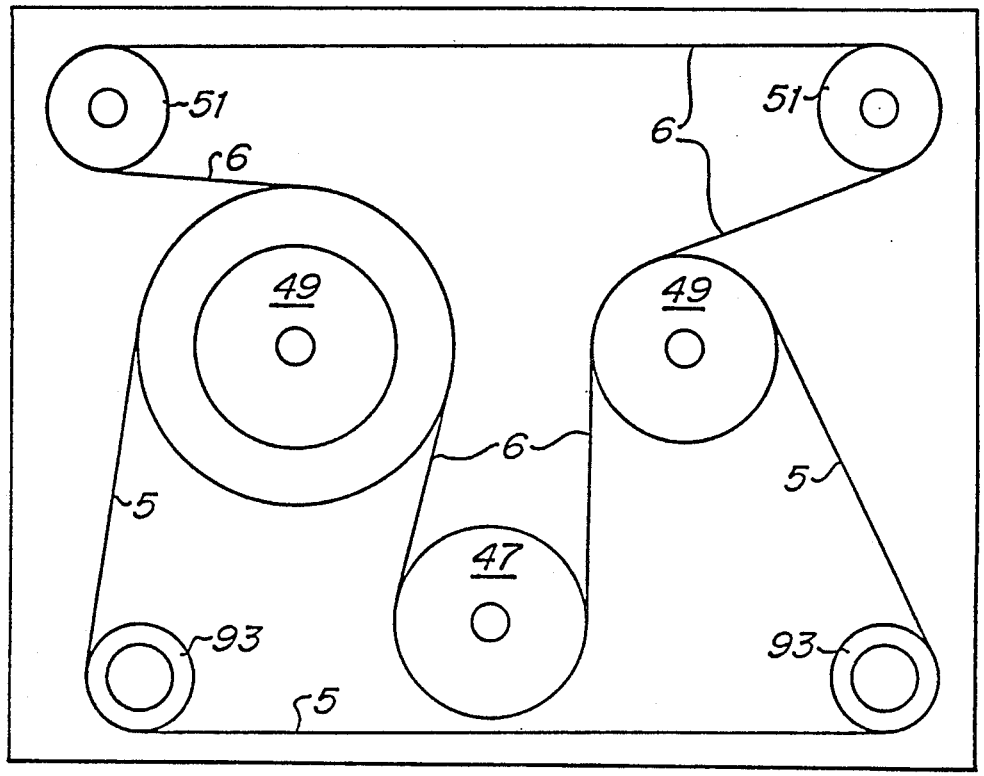
FIGS. 9(a) through 9(d) are schematic illustrations of the steps of loading tape hubs and rollers and drive belt and tape onto receiving pins and guides of a base plate according to the present invention.
Figure 9B:
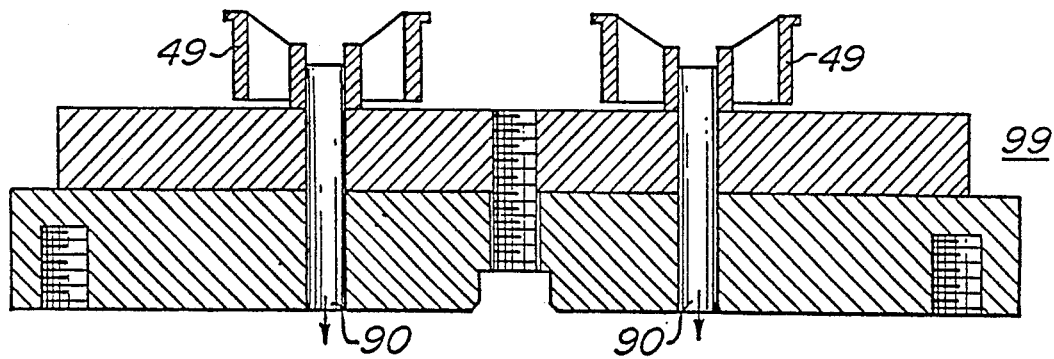
Figure 9C:
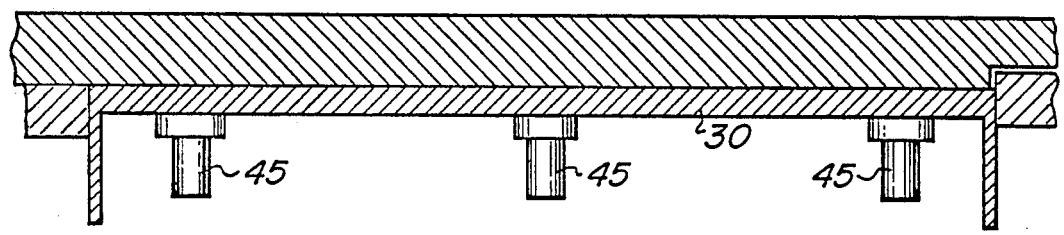
Figure 9D:
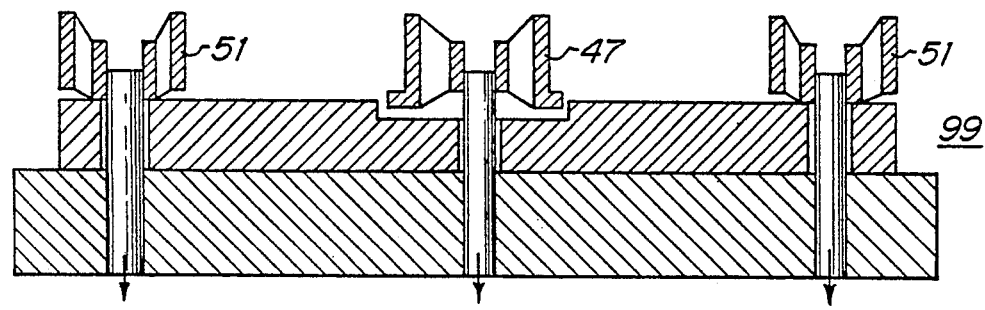

Referring now to FIG. 8(a)-(c), there are shown pictorial illustrations of the sequence of steps by which the pins 45 are rigidly mounted within the raised bosses 43 that are integrally formed in the base plate 30. Specifically, the pins 45 are mounted in a fixture 80 which holds the pins 45 in proper orientation, elevation, and vertical alignment to mate with the apertured bosses 43 in the base plate 30. Additionally, midguide pin 55 and tape guides 53 may also be mounted in the fixture 80 for assembly at this step of the process. Thereafter, the base plate 30 is urged into engagement with the leading edges 82 of the pins, and is ultrasonically agitated into position on the pins 45 via an ultrasonic energy source coupled in conventional manner to the supporting horn or chuck 84. The leading edges 82 of the pins 45 may include sharp shoulders or knurled surfaces (or flat recesses, as illustrated in FIG. 2) with the outer diameter of the leading edges of the pins 45 being slightly larger than the inner diameter of the apertured bosses 43. The application of ultrasonic energy to the base plate 30 plasticizes the boss material at least about the pins due to the ultrasonic heating of the material, and excess material 87 is carried forward into the aperture in the bosses 43 to fill the aperture and form a floor therein to further support the pins 45. Thereafter, ultrasonic energy ceases to be supplied to the horn or chuck 84, and the material of the base plate returns to its original set condition, rigidly holding the pins 45 in positions within the integral bosses 43 for removal as a unified assembly from the fixture 80.

Referring now to FIG. 9(a)-(d), there are shown pictorial representations of the sequence of assembly steps used to load a length of tape and drive belt and associated rollers and hubs onto the pins 45 in the unified base plate assembly 30. These steps greatly facilitate the assembly of the finish cartridge over the obstacles of sidewalls that inhibit winding a length of tape onto assembled, rotatable hubs which might otherwise be positioned on the base plate 30 for convenient coiling thereon of a length of tape. Therefore, a length of tape 5 that is secured at both ends thereof to the tape hubs 49 is positioned upside down on transfer pins 90 over the course of tape travel from one hub 49, over a corner tape-guide transfer sleeve 93, to another corner tape-guide transfer sleeve 93, and then to the other hub 49, all in upside down orientation. In addition, the resilient drive belt 6 is assembled along the belt path around a drive roller 47, along the peripheries of the rolls of tape on the tape hubs 49, and around the corner rollers 51, all in upside-down orientation. The transfer pins and sleeves are resiliently retained in a fixture 99 to retract against the axial force applied thereto by the pins 45 and guides 53 of the base plate 30 with which they align. Therefore, as the base plate assembly 30 is positioned over the fixture 99, now loaded upside down with tape, belt, rollers and hubs, and pressed into position, the transfer pins and sleeves retract out of the way as the mating pins and sleeves of the base plate advance into final position. Thus, the assembled components are thereby transferred to the base plate assembly 30 in right-side up orientation thereon, and the fixture 99 may be removed leaving the tape, drive belt, hubs and rollers fully assembled on the base plate 30 with the periphery of the drive roller 47 partially protruding through the upper aperture 44 in front wall 38. The tape path as assembled within the cartridge therefore passes from a coil of tape on one tape hub 49, around corner tape guide 53, through the recess 16 in the front wall 38, past the midguide pin 55, past the drive roller 47 (without contact), past the optical window 40 and prism 42, around the tape guide 53 in the opposite corner, to the coil of tape on the other tape hub 49. The path of the drive belt 6 is assembled around the drive roller 47, along the peripheries of coils of tape on the tape hubs 49 and around the rollers 51 in the rear corners of the cartridge. Thereafter, the top plate 12 may be assembled by press-fitting the top plate and the apertures 64 therein over the upper ends of the aligned pins 45, and may be attached to the side walls 32, 34, 36 and 38 in conventional manner using ultrasonic welding or adhesive along the mating peripheries of the top plate 12 and top edges of the side walls 32, 34, 36, 38 to complete the tape data cartridge according to the present invention. Optical signals may pass through window 52 and through prism 42 to be reflected thereby through apertures located near the beginning and end of the length of tape 5, and through window 40 in the front wall 38.

Therefore, the tape data cartridge designed and assembled according to the present invention greatly reduces total cost of manufacture to provide a rigid tape storage medium that fully complies with standard specifications for tape data cartridges.

What is claimed is:

1. A method of assembling rotatable components into a tape cartridge having a baseplate including mounting pins for rotatably supporting the components, the method comprising the steps of;

positioning transfer pins in alignment with the mounting pins of a baseplate;

assembling rotatable components of the tape cartridge on the transfer pins in upside down orientation; and relatively moving the transfer pins and the rotatable components assembled thereon into alignment with the mounting pins on the baseplate, and simultaneously withdrawing the transfer pins to transfer the assembled components thereon onto the mounting pins on the baseplate in rotatable, right side up orientation thereon.

2. The method according to claim 1 wherein the step of withdrawing the transfer pins includes retracting the transfer pins in response to advance of the aligned mounting pins of the baseplate in contact with the respective transfer pins.

3. The method according to claim 1 of assembling components into a tape cartridge having a baseplate including a pair of mounting pegs on raised bosses for supporting thereon a pair of tape guides each having radially outwardly-extending flanges spaced apart on ends thereof by the width of a length of tape, and including the steps of;

positioning tape guides on the mounting pegs with the tape guide flanges positioned on the raised bosses to orient the tape guides perpendicular to the raised bosses and to the form a seal therewith;

applying fluid, curable adhesive between the tape guides and the mounting pegs on the baseplate; and curing the adhesive to rigidly secure the pair of tape guides to the pair of mounting pegs with the tape guide flanges positioned on the raised bosses of the baseplate for maintaining a length of tape at a selected elevation between the pair of tape guides relative to the raised bosses.

4. The method according to claim 1 for assembling components into a tape cartridge having a baseplate including integrally formed upstanding sidewalls about substantially the entire perimeter thereof, and including the steps of;

forming a substantially planar top plate having perimeter boundaries substantially aligned with perimeter boundaries of the sidewalls of the baseplate; and rigidly adhering substantially the entire perimeter of the top plate to corresponding upper edges of the sidewalls on the baseplate to form a rigid structure containing components mounted on the baseplate.

5. The method according to claim 4 wherein said baseplate with integral sidewalls is formed of a material including polycarbonate; and said top plate is formed of a material including polycarbonate having substantially similar thermal coefficient of expansion as the material of the baseplate and sidewalls.

* * * * *